United States Patent [19]
Dreher

[11] Patent Number: 5,895,992
[45] Date of Patent: Apr. 20, 1999

[54] ELECTROMECHANICAL LINEAR ACTUATOR

[75] Inventor: Lincoln J. Dreher, Washington, Mo.

[73] Assignee: Von Weise Gear Company, St. Clair, Mo.

[21] Appl. No.: 09/061,590

[22] Filed: Apr. 16, 1998

Related U.S. Application Data

[63] Continuation of application No. 08/784,581, Jan. 17, 1997
[60] Provisional application No. 60/010,100, Jan. 17, 1996.

[51] Int. Cl.$^6$ .................................................. F16H 25/20
[52] U.S. Cl. .................. 310/80; 74/89.15; 74/424.8 R
[58] Field of Search .................................. 310/20, 80, 89, 310/83, 91; 74/89.15, 424.8 R, 458, 459

[56] References Cited

U.S. PATENT DOCUMENTS

| | | | |
|---|---|---|---|
| 3,604,962 | 9/1971 | Larson | 310/67 |
| 4,695,602 | 9/1987 | Crosby et al. | 524/439 |
| 4,719,379 | 1/1988 | Daniels et al. | 310/71 |
| 4,885,948 | 12/1989 | Thrasher, Jr. et al. | 74/89.14 |
| 4,910,419 | 3/1990 | Hayashi et al. | 310/13 |
| 4,929,118 | 5/1990 | Anderson | 403/356 |
| 5,053,685 | 10/1991 | Bacchi | 318/135 |
| 5,095,612 | 3/1992 | McAvena | 29/596 |
| 5,714,815 | 2/1998 | Fritzinger et al. | 310/89 |

*Primary Examiner*—Thomas M. Dougherty
*Assistant Examiner*—Judson H. Jones
*Attorney, Agent, or Firm*—Lorusso & Loud

[57] ABSTRACT

An electro-mechanical linear actuator including a drive motor, a capacitor, a die-cast gear box, and a drive nut system. The die-cast gear box is capable of receiving multiple drive motor diameters, and the drive motor may be staked to the gear box. A coverless-capacitor is fixed to the gearbox without fasteners, and knock-out plugs are die cast into the gearbox. Integral cord strain reliefs are provided to eliminate the need for plastic bushings. The assembly includes a metal drive key that mates with the drive shaft and an output gear for transmitting torque to the drive shaft. A plastic flange bearing provides bearing surfaces for the drive key and the drive shaft. A high efficiency reinforced self-guided ACME nut travels linearly along the drive shaft. A tight diameter is used on the ACME nut thread form, and a bearing section is provided on its outboard to maximize screw-to-nut alignment. Snap-fit adjustable cams allow easy adjustment of the travel of the drive nut along the shaft via limit switches. A satellite dish actuator assembly provided about the drive shaft includes an outer tube, an inner tube, and a three axis mounting stud. The outer tube may be fastened to cylindrical dust cover wall in the die cast gear box, or secured using a dust cover adaptor. The inner tube is secured to the drive nut using a replaceable tube/nut connector guide that keys the nut to the inner tube while centering them both in the outer tube. The three-axis mounting stud is secured to the end of the inner tube and allows three axis of freedom at low cost.

24 Claims, 10 Drawing Sheets

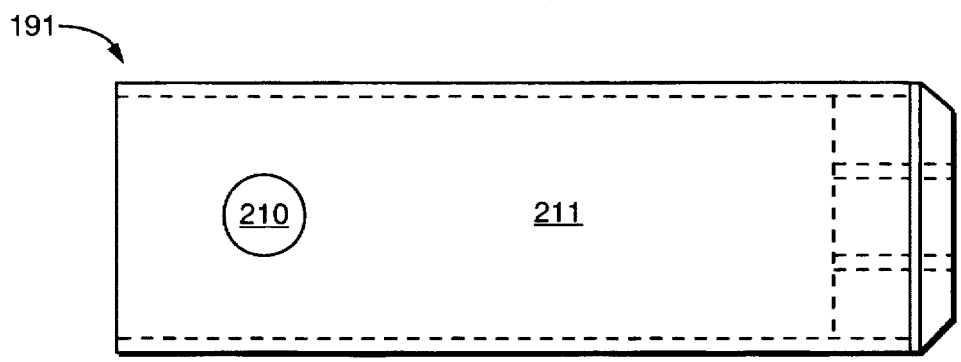
FIG. 33
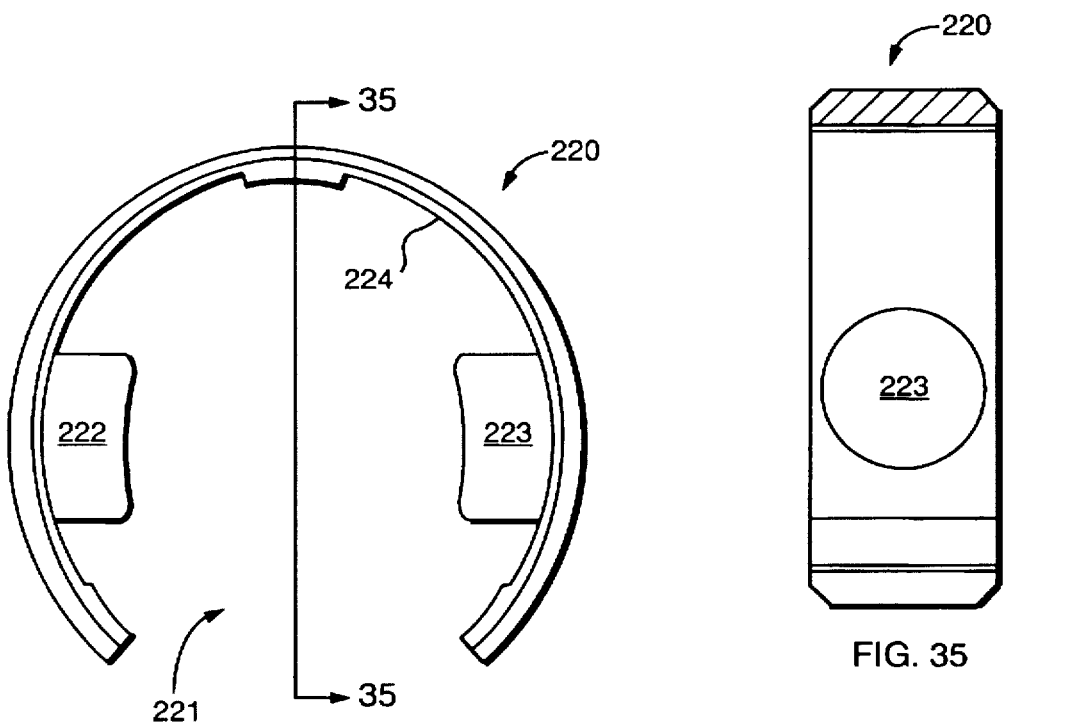
FIG. 34
FIG. 35
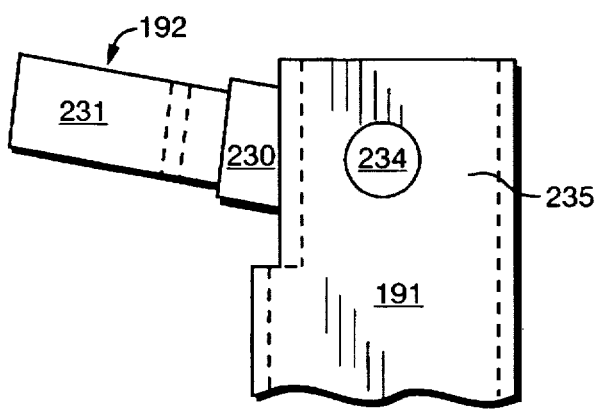
FIG. 36
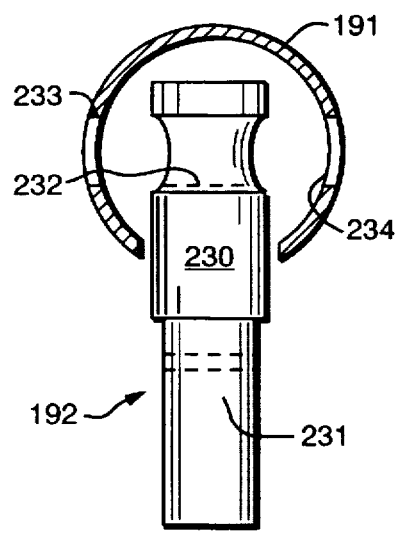
FIG. 37

5,895,992

ELECTROMECHANICAL LINEAR ACTUATOR

CROSS REFERENCE TO RELATED APPLICATIONS

The present application is a continuation of co-pending application Ser. No. 08/784,581 filed Jan. 17, 1997, which claims the benefit of U.S. provisional application Ser. No. 60/010,100 filed Jan. 17, 1996.

FIELD OF THE INVENTION

The present invention relates an improved electromechanical linear actuator, and, more particularly, to a linear actuator having improved manufacturability and operation.

BACKGROUND OF THE INVENTION

Linear actuators are commonly used in a wide variety of applications. These motors generally include an A.C. or D.C. drive motor, a gear assembly, and a drive shaft or lead screw. The gear assembly transmits the output torque of the drive motor to the drive shaft according to a predetermined gear ratio.

The drive shaft is threaded, and a threaded drive nut positioned on the shaft. Rotation of the shaft causes the drive nut to travel linearly along the shaft to generate linear motion in a connected assembly. Due to the interrelationship of intricate mechanical and electrical components of linear actuators, the manufacturing process is typically time consuming and inefficient. Accordingly, as with many industries, the linear actuator industry has constantly pursued new methods of assembly which would reduce the number of parts and manufacturing steps involved while maintaining the quality of the product. To date, however, the industry has failed to minimize the number of parts and manufacturing steps in a high quality linear actuator.

OBJECTS OF THE INVENTION

Accordingly, it is an object of the present invention to provide a linear actuator or gear motor having simplified construction thereby allowing simple and efficient assembly and repair.

Another object of the present invention is to provide a linear actuator motor having die-cast parts for replacing conventional formed parts.

Still another object of the invention is to provide a linear actuator or gear motor having a housing capable of receiving a multiple of different drive motor diameters.

Still another object of the invention is to provide a linear actuator or gear motor wherein the drive motor is staked to the gear housing and, thus, fixed to the gear housing without the use of fasteners.

Still another object of the invention is to provide a linear actuator or gear motor having an integral cord strain relief which retains the electric power cord between two halves of the gear housing without requiring additional components.

Still another object of the invention is to provide a linear actuator or gear motor having a coverless capacitor secured to the motor and gear housing without the use of fasteners.

Still another object of the invention is to provide a linear actuator or gear motor having snap-fit adjustable limit switch cams for simplifying assembly.

Still another object of the invention is to provide a linear actuator or gear motor having knock-out plugs formed in therein which may be punched out when holes in the gearbox are needed.

Still another object of the invention is to provide a linear actuator or gear motor having a drive key for transmitting torque and thrust from the output gear of the gear-train to the drive shaft.

Still another object of the invention is to provide a linear actuator or gear motor having a high strength, plastic thrust bearing.

Still another object of the invention is to provide a linear actuator or gear motor having a high strength, high efficiency drive nut.

Still another object of the invention is to provide a linear actuator or gear motor having a self-guided drive nut.

Still another object of the present invention is to provide a linear actuator motor having easily replaceable parts such as a replaceable tube/nut connector guide for allowing facile servicing of a tube/nut assembly.

Still another object of the present invention is to provide a linear actuator motor having a dust cover adaptor which fits between the dust cover and gear box for fastening the dust cover to the assembly without the use of fasteners.

Still another object of the present invention is to provide a linear actuator motor having a dust cover adaptor which fits between the dust cover and gear box for fastening the dust cover to the assembly without the use of fasteners.

Still another object of the present invention is to provide a linear actuator motor having a three axis mounting stud for mounting to a satellite dish which allows three axis of movement in a simple and efficient design.

These and other objects of the present invention will become apparent from a review of the description provided below.

SUMMARY OF THE INVENTION

The present invention is organized about the concept of providing a linear actuator having a minimal number of mechanical and electrical parts and requiring a minimum number of manufacturing steps while maintaining reliable operation.

The linear actuator motor of the present invention includes a drive motor, a capacitor, a die-cast gear box, and a drive nut system. The die-cast gear box includes inner and outer cylindrical walls which are capable of receiving multiple drive motor diameters. The drive motor may be press fit over the outer cylindrical wall and then staked to the gear box die cast.

The gear box also includes a cylindrical capacitor wall over which the capacitor needed to run permanent split capacitor motors on alternating current linear actuators is fit. The capacitor is trapped securely between a capacitor tab on the drive motor casing and cylindrical capacitor wall on the gearbox housing during the assembly process.

In addition, knock-out plugs are die cast into the gearbox. The knock-out plugs are partially formed holes that can be left untouched for a fully enclosed gearbox or punched out when holes are needed. Thus, the knockout plugs allow a single die cast gearbox to be used in many different variations and applications.

Another advantageous feature of the die cast gear box, lies in the provision of an integral motor cord strain relief. As the jacketed electric power cord enters the linear actuator housing, it is squeezed between the two sections of the gear box through a knock-out opening formed in the die cast. A similar integral strain relief opening is provided between the bottom half of the gear box housing and an limit switch cover for the control power cord.

For transmitting torque from the gear train to the drive shaft or lead screw a metal drive key is provided. The drive shaft is machined with a straddled broach which mates with a slot formed in the drive key. The drive key matingly engages the output gear of the gear train thereby transmitting torque to the drive shaft. In a preferred embodiment, two semi-cylindrical drive keys are used; one on each side of the straddled broach. Alternatively, a single piece drive key with a slot may be used.

The drive shaft extends into the gearbox through plastic thrust bearing arranged in an opening in the gear box. The thrust bearing is a high-strength, high-efficiency, plastic flange bearing which provides a radial bearing surface for the drive shaft and a thrust surface for the drive key through a washer.

Another advantageous feature of the present invention lies in the provision of a self guided high efficiency acme drive nut (or ACME nut). The drive nut is formed using a reinforced, lubricated resin material for higher strength, higher efficiency, and greater thread accuracy. The drive nut uses a tighter than standard major diameter on its thread form, and also incorporates a bearing section on its outboard end that runs tightly on the outside diameter of the mating thread of the drive shaft to maximize screw-to-nut alignment.

For allowing easy adjustment of the travel of the drive nut along the shaft a pair of snap fit adjustable cams are provided for tripping forward and reverse limit switches. The adjustable cams have a spring-loading snap-fit attachment, allowing the cams to rotate relative to each other. Each cam includes equally spaced teeth which matingly engage corresponding teeth on the other cam to allow precise adjustment of the relative positions of the cams for tripping the limit switches.

According to another aspect of the invention, a satellite dish actuator assembly is provided about the drive shaft having: a hollow outer cylindrical tube or dust cover, a hollow inner cylindrical tube, and a three axis mounting stud. In connection with the satellite dish actuator assembly an integral strain relief for the electrical cord is provided by die cast rims on the bottom of the gear box. The power cord is routed from outside of the housing and between rims. A plastic part is fit over the rims to secure the cord.

The outer tube of the assembly may be screwed to cylindrical dust cover wall in the die cast gear box, or secured using a dust cover adaptor. The dust cover adaptor is a plastic part that snap-fits between the dust cover and the gear box, eliminating the need for fasteners.

The inner tube of the assembly is secured to the drive nut using a replaceable tube/nut connector guide. The connector guide keys the nut to the inner tube while centering them both in the outer tube and allowing the parts to be easily disassembled for repair or replacement. The three-axis mounting stud is secured to the end of the inner tube and allows three axis of freedom at low cost.

BRIEF DESCRIPTION OF THE DRAWING

For a better understanding of the present invention, together with other objects, features and advantages, reference should be made to the following description of the preferred embodiments which should be read in connection with the following figures wherein like numerals represent like parts:

FIG. 33: is a side view of an inner tube according to the invention.

FIG. 34: is a front view of a replaceable tub/nut connector guide according to the invention.

FIG. 35: is a sectional view the replaceable tub/nut connector guide shown in FIG. 34.

FIG. 36: is a side view of a three axis mounting stud according to the invention.

FIG. 37: is a top view of the three axis mounting stud shown in FIG. 36.

DETAILED DESCRIPTION OF THE INVENTION

Figure 1:
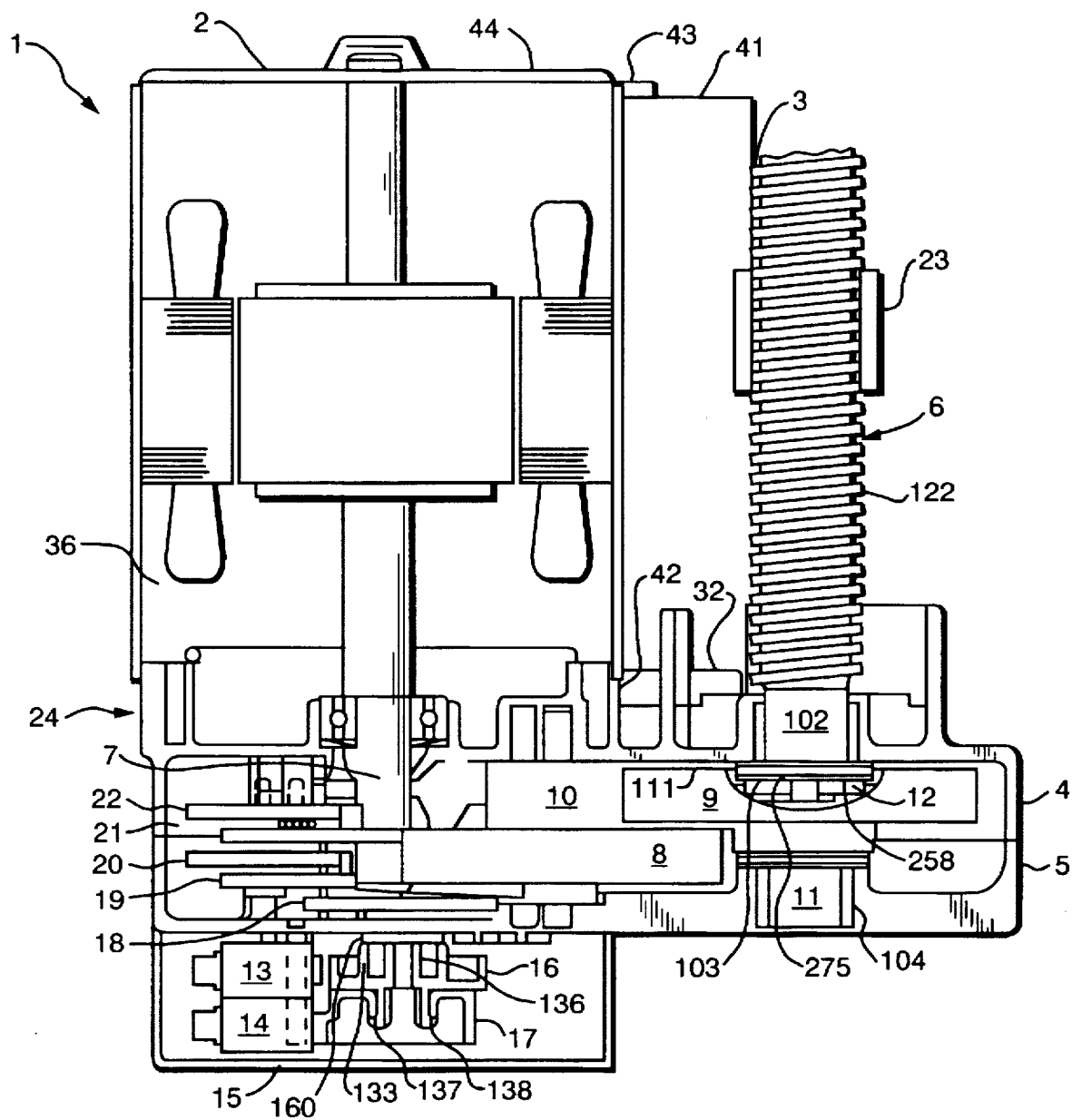
FIG. 1: is a side sectional view of a first embodiment of a linear actuator assembly according to the invention.

Referring to FIG. 1 of the drawing, there is shown a preferred linear actuator motor 1 according to the present invention.

As shown, the linear actuator motor 1 according to the present invention generally includes a drive motor 2, a mounted capacitor 3 electrically connected to the drive motor, a zinc die-cast gear box 24 having an upper half 4 and a lower half 5, and a lead screw or drive shaft 6. The drive motor, which may be an A.C. or D.C. motor, has an output shaft 7 which extends into the gear box 24 into meshing engagement with an input gear 8. An output gear 9 in meshing engagement with a hub 10 of the input gear 8 is connected to a shank 11 the drive shaft 6 through a drive key 12. The input shaft rotation and torque is transmitted from the output shaft 7 to the threaded drive shaft 6 according to the gear ratio established by the input 8 and output 9 gears. Rotation of the drive shaft, in turn, causes a drive nut 23 to travel linearly along the length thereof in a direction depending upon the direction of rotation. The drive nut 23 may be connected to an assembly (not shown), e.g. a hospital bed or satellite dish, for causing linear motion therein.

A forward limit switch 13 and a reverse limit switch 14 are mounted to the bottom of the lower half 5 of the gear box 24 and covered by a plastic limit switch cover 15. As is known, the limit switches 13, 14 are provided to interrupt the electrical input to the drive motor when the motor has been operating for a predetermined amount of time in either a forward or reverse direction. The switches 13, 14, are tripped by snap-fit adjustable cams 16, 17, respectively, which are connected to a plurality of timing gears 19–22 through a limit switch gear 18. The timing gears cause rotation of the cams 16, 17 about their center axis at a predetermined rate which corresponds to the forward and reverse operational limit of the motor. When the forward or reverse operational limit of the motor is reached, the corresponding cam 16 or 17 trips the appropriate limit switch 13, 14 to interrupt electrical input to the motor.

Figure 2:
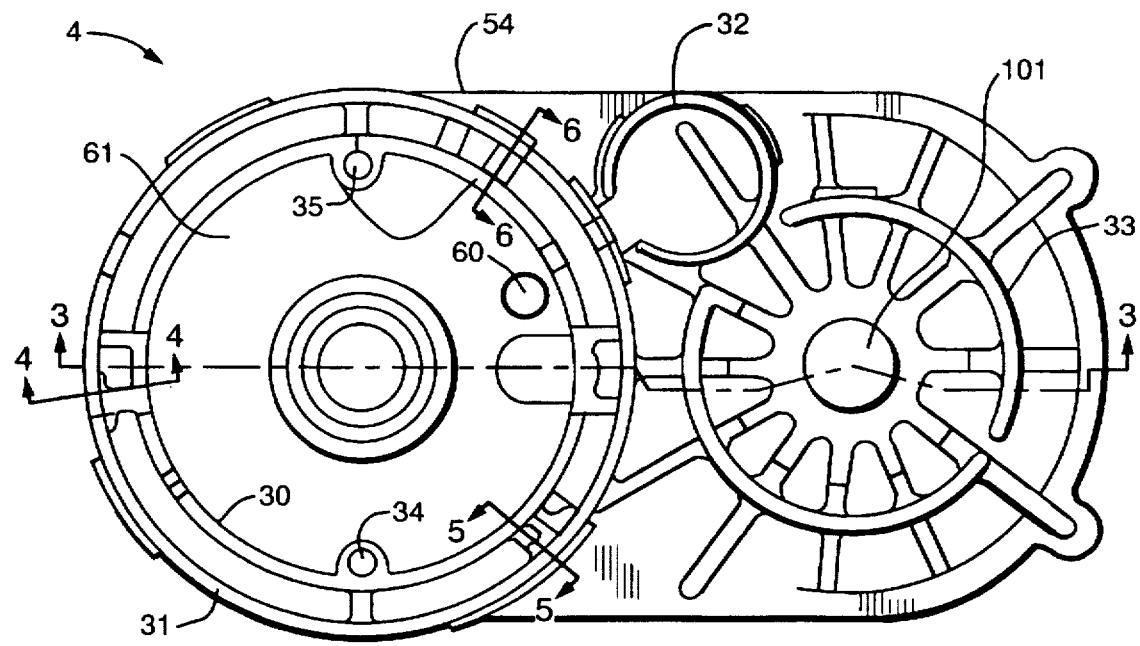
FIG. 2: is a top view of an upper portion of a gear box according to the present invention.
Figure 3:
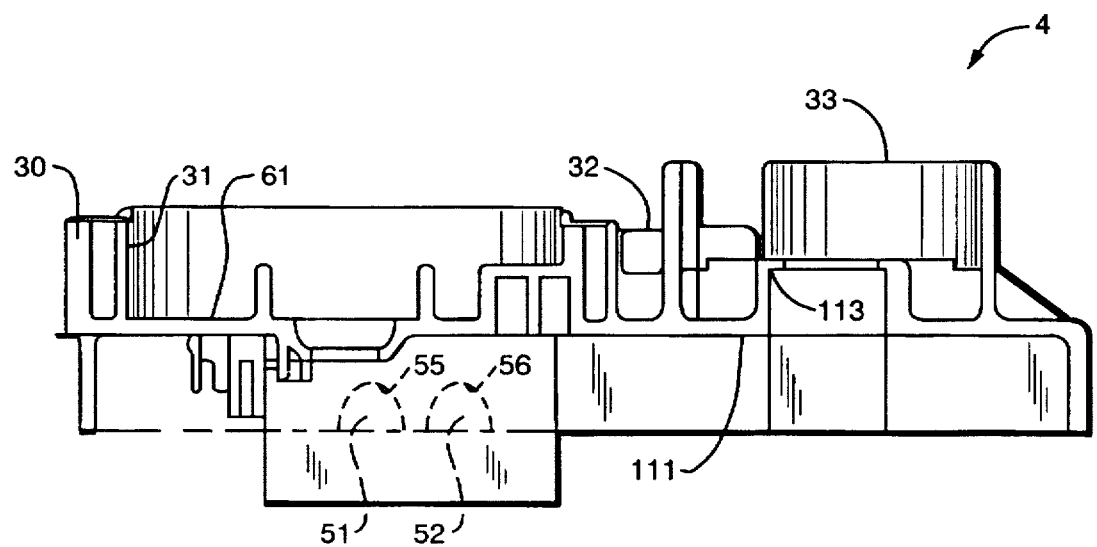
FIG. 3: is a side sectional view of the gearbox shown in FIG. 2 taken along lines III—III.

As shown in FIGS. 2 and 3, the upper half 4 of the gear housing 24 includes four cylindrical wall portions extending from the top thereof; an inner motor diameter wall 30, an outer motor diameter wall 31, a capacitor wall 32, and a dust cover wall 33. Advantageously, the inner 30 and outer 31 motor diameter walls provide capability for the die cast gear box 24 to receive two different motor diameters. To assemble a smaller diameter motor the gear housing 24, the motor is positioned over the inner motor diameter wall 30 to be supported thereby, and the motor is fastened to the gear housing 24 through screw holes 34,35.

Figure 4:
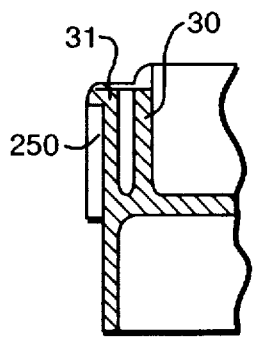
FIG. 4: is a sectional view of the gearbox shown in FIG. 2 taken along lines IV—IV showing an indented portion thereof for staking a motor casing thereto.
Figure 5:
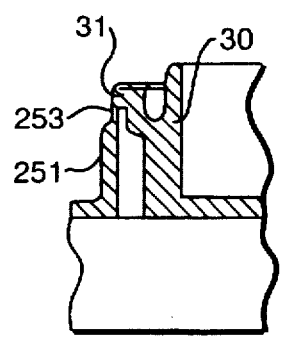
FIG. 5: is a sectional view of the gearbox shown in FIG. 2 taken along lines V—V showing a first thin-walled portion thereof for staking a motor casing thereto.
Figure 6:
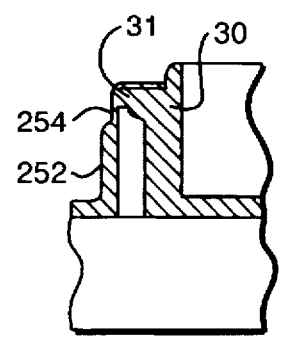
FIG. 6: is a sectional view of the gearbox shown in FIG. 2 taken along lines VI—VI showing a second thin-walled portion thereof for staking a motor casing thereto.

However, for securing a larger diameter motor to the gear box 24, the upper half 4 is provided with an under-cut lip 250 or indentation, as shown in FIG. 4, and two thin walled portions 251, 252, as shown in FIGS. 5 and 6. The larger diameter motor is positioned over the outer diameter wall, and then staked to the outer wall 31 by punching the motor casing 36 (FIG. 1) inward in the areas mating with the indentation 250 and the two thin walled portions 251, 252. The motor casing 36 is thus deformed in the area of the under cut lip 250, and cannot be withdrawn from the gear box 24 since the casing 36 will not fit over the lip 250. In the areas mating with the thin walled portions 251, 252, when the casing is punched inward, the thin walled portions are crushed inwardly, and the casing is deformed to be caught under the lips 253, 254. Advantageously, therefore, the motor may be fixed to the gearbox over the larger diameter outer wall 31 without the use of fasteners, and without requiring side cores in the die cast tool or secondary machinery.

Figure 7:
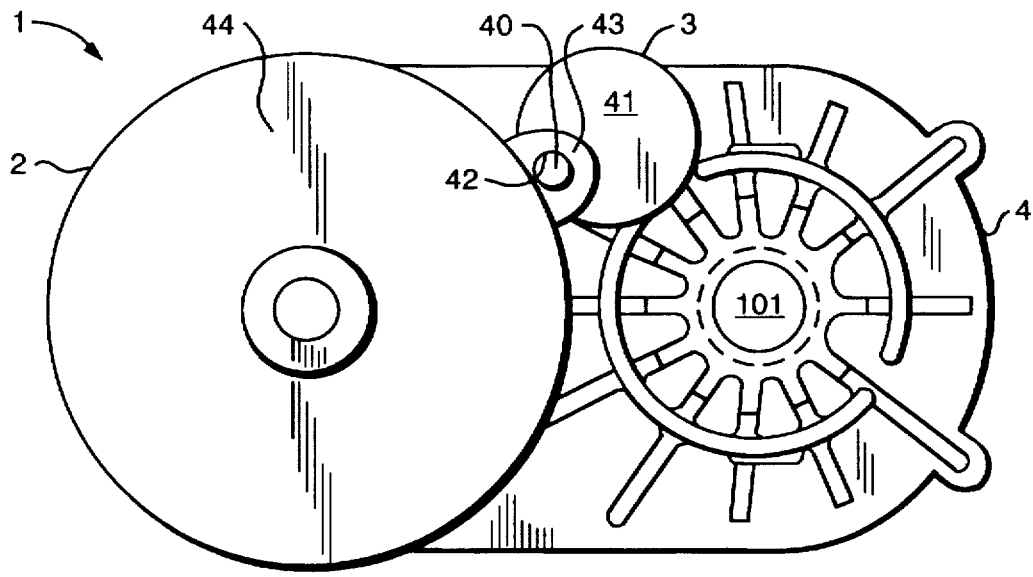
FIG. 7: is a top view of a first embodiment of a linear actuator assembly according to the invention.

Referring again to FIGS. 1, 2 and 7, the capacitor wall 32 provides a mounting location for the capacitor 3. During assembly of the linear actuator 1, the capacitor casing 42 is press fit over the capacitor wall 32. A tab 40 extending axially from the top 41 of the capacitor casing is then inserted into an opening 42 in a capacitor tab 43 extending laterally from the top 44 of the motor casing. Thus, when the motor is secured to the gear box 24, the capacitor 3 is secured between the capacitor tab 41 and the upper half 4 of the gear box. Advantageously, no other fasteners are required. This significantly improves the cost and efficiency of the manufacturing process of the prior art wherein the capacitor is placed inside a cover and attached to the motor or gearbox with screws or nuts and bolts.

Figure 8:
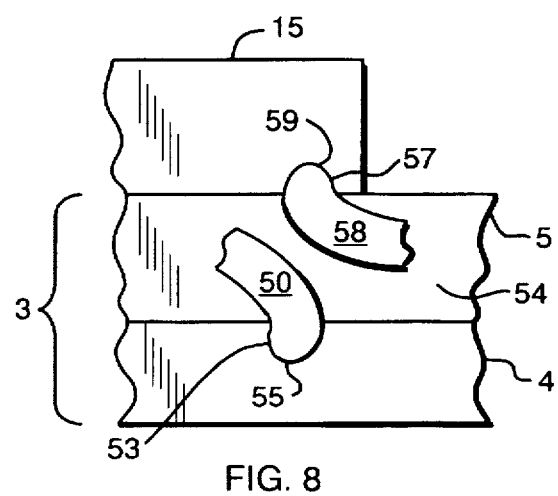
FIG. 8: is a side view of a rear portion of gearbox according to the invention showing integral cord strain reliefs.

Another advantageous feature of the present invention is the provision of an integral motor cord strain relief 15, as shown in FIGS. 3 and 8. The die-cast upper half 4 of the gear box of the present invention is provided with a pair of knock-outs 51, 52 on one side 54 thereof through which electrical power cords of different standard sizes may pass to provide electrical input to the drive motor 2. Depending upon the size of the jacketed electric power cord 50, one of the knock-outs is removed to create an opening 53 through which the cord may pass into the housing, as shown in FIG. 8. The opening 53, thus formed, is preferably triangular in shape with a flattened top 55 or 56, and is undersized compared to the diameter of the cord 50. When the upper 4 and lower halves 5 of the gear box 24 are assembled and secured together (i.e. by screws), the cord 50 is squeezed in the opening 53 between the upper and lower half to provide an integral cord strain relief.

A similar integral strain relief opening 57 is formed in the plastic limit switch cover 15, as shown in FIG. 8, for providing an integral strain relief for an electrical cord 58 providing control power to the unit. Again, the opening 57 is preferably triangular with a flattened top 59, and is undersized compared to the diameter of the cord 58. When the limit switch cover is fastened to the lower half 5 of the gear box 24, the cord 58 is squeezed in the opening 57 between the cover 15 and the lower half 5 of the gear box.

In the prior art, the cord strain reliefs are typically formed from compressible molded plastic bushings spring-loaded into an opening in the housing and limit switch cover. The integral cord strain reliefs of the present invention, therefore, eliminate at least two parts (i.e. the plastic bushings), and at least one assembly process compared to the prior art.

Figure 9:
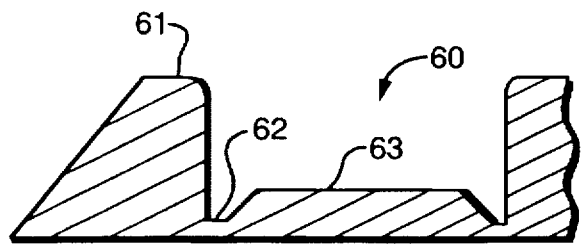
FIG. 9: is a sectional view of knock-out plug according to the invention.

Another advantageous feature of the present invention lies in the provision of one or more knock-out plugs 60 in the die-cast gearbox 24. As shown in FIGS. 2 and 9, the knock-out plugs 60 are partially formed holes that can be left untouched for a fully enclosed gearbox or punched out when holes are needed. The location of the knockout plugs depends on the intended uses of the assembly 1. In a preferred embodiment, as shown in FIG. 2, a knockout plug 60 is die cast into the upper half 4 of the gear box 24 within the diameter of the inner motor diameter wall 30. This knockout plug 60 provides an optional drainage hole for lubricants used on the motor shaft 7. Other knock-out plugs (not shown) may be advantageously positioned on the lower half 5 of the gearbox 24 for providing optional access for power cords, providing an opening providing drainage holes, etc.

All knock out plugs 60 are preferably die-cast into the casing to be recessed into the casing wall 61 leaving a thin annular wall portion 62 and a frustoconical portion 63, as shown in cross-section in FIG. 9. To remove the knock-out plug, a blunt instrument is forced down onto the top of the frustoconical portion 63 to punch the plug through the wall 61 of the gear box casing thus creating an opening therein. In the prior art, the gearbox was die cast either with a fully formed hole for a particular application, or the gearbox was completely closed requiring formation of holes according to the application. Thus, the die cast knock-out plugs 60 allow a single die cast gearbox 24 to be used in many different variations and applications.

Turning again to FIG. 1, torque supplied by the drive motor 2 is multiplied by the input 8 and output 9 gears and transmitted to the drive shaft by the drive key 12. The drive key 12 is preferably from a powdered metal or stamped steel. In the preferred embodiment the drive key is formed in two pieces by two identical and separate halves 280,281 as shown in FIGS. 38–41. Each half 280,281 has a semi-cylindrical member 250 having a slot 251 formed therein. The slot 251 has rear wall portion 252 and radiused top and bottom portions 253, 254 which correspond to the radius of the shank 11 of the drive shaft 6. A tab 255 extends radially from the semi-cylindrical member at approximately 90° from the ends 256, 257 of the member 250. As shown particularly in FIG. 39, the front 258 of the each half 280,281 of the drive key 12 has a uniform flat surface with the tab extending flush therewith, while the tab 255 is recessed relative to the back surface 259.

Figure 13:
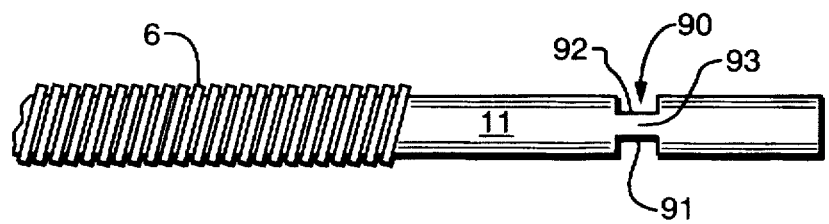
FIG. 13: is a partial top view of a drive shaft according to the invention.

Referring also to FIG. 13, the slot 251 in each half 280,281 of the drive key 12 is sized to mate with one side 91, 92 of a straddled broach 90 formed in the shank 11 of the drive shaft 6. Each half 280,281 is fit over a side 91 or 92 of the straddled broach 90 such that the rear wall portion 252 of each half 280,281 is positioned on an opposite side 91, 92 of the straddled broach 90. The top and bottom radiused portions 253, 254 of each half 280,281 of the drive key rest on opposite sides of the top 93 and bottom 270 (FIG. 41) radiused portions of the straddled broach 90.

Figure 14:
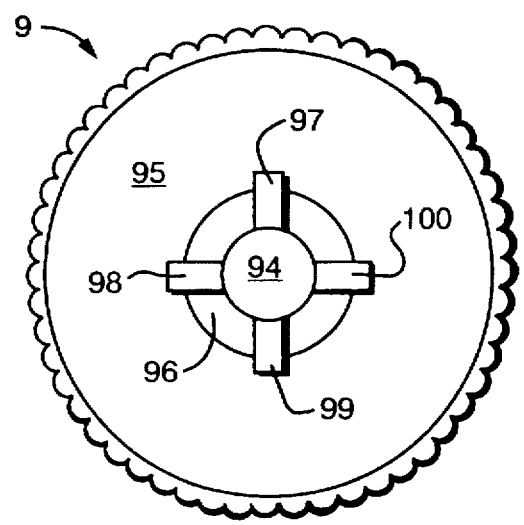
FIG. 14: is a front view of an output gear according to the invention.

Turning to FIG. 14, the shank with the two halves 280,281 of the drive key 12 fixed thereto, as described above, is passed through the center opening 94 in the output gear 9. The output gear has a flat face portion 95 has an axially recessed circular portion 96 concentric with the opening 94. Four radial spokes 97–100 are formed in the face 95 of the gear 90° apart relative to the circumference of the opening 94. The spokes are axially recessed relative to the axially recessed circular portion 96, and are sized to receive the tabs 255 of the two halves 280,281.

Figure 41:
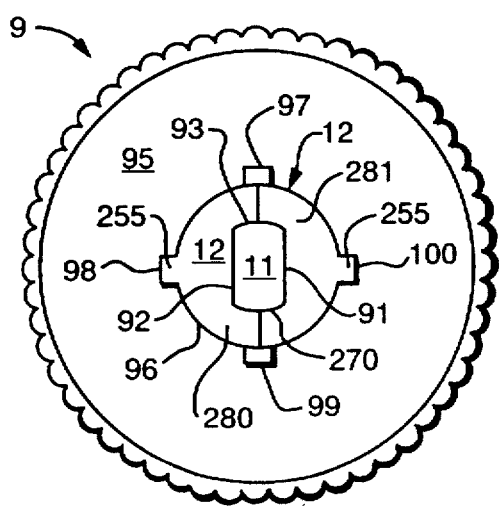
FIG. 41: is a sectional view of a preferred output gear having a drive shaft secured thereto via two drive keys.

As shown in FIG. 41 the two drive key halves 280,281 mate with the recessed circular portion 96 and two of the four radial spokes 97–100. The back surface 259 of each drive key half 280,281 rests on the recessed circular portion 96 of the output gear 9, and the tabs 255 each extend into a radial spokes, e.g. spokes 98 and 100.

The drive key 12 is thus, fixed securely about the straddled broach 90 in the drive shaft and is securely positioned within the recessed circular portion and radial spokes of the output gear 9. As the output gear rotates, torque is transmitted from the output gear to the drive shaft through the two-piece drive key. In prior art linear actuators the final gear in the gear box is attached to a drive nut. Typically the drive nut has a cross-hole drilled therethrough into which a pin is inserted. To transmit torque from the final gear to the drive nut, the pin is adapted to extend radially from the drive nut and engage the final gear. Advantageously, the present invention eliminates the need for the cross-hole and pin.

Figure 10:
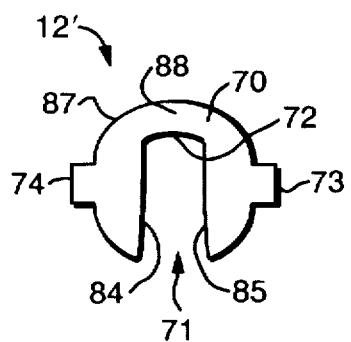
FIG. 10: is a rear view of a single-piece drive key according to the invention.
Figure 11:
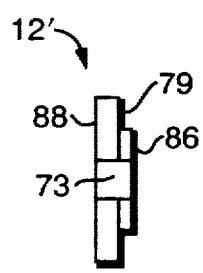
FIG. 11: is a side view of the drive key shown in FIG. 10.
Figure 12:
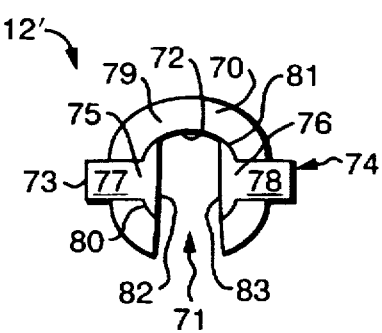
FIG. 12: is a front view of the drive key shown in FIG. 10.

An alternative single-piece embodiment of a drive key 12' is shown in FIGS. 10–12. As shown, the alternative drive key 12' has a cylindrical member 70 having a slot 71 formed therein. The slot 71 has a radiused top portion 72 which corresponds to the radius of the shank 11 of the drive shaft 6.

First and second opposed tabs 73,74 are positioned 180° apart relative to the circumference of the cylindrical member. Each tab 73, 74 includes a semi-circular base portion 75,76 and a rectangular leg portion 77, 78 extending radially from the base portion. The semi-circular base portions extend axially from a back 79 of the cylindrical member 70, and has a radiused edges 80,81 corresponding to the radiused top portion 72 of the slot 71. The bottom edges 82,83 of the semi-circular base portions 75,76 are flush with the sides 84,85 of the slot. The leg portions 77,78 extend axially from the base portions flush with the top surface (e.g. 86) thereof and axially from the outside edge 87 of the cylindrical member 70. As shown in FIGS. 10 and 11, the front 88 of the drive key has a uniform flat surface.

Referring again to FIG. 13, the slot 71 in the drive key 12' is sized to mate with a straddled broach 90 formed in the shank 11 of the drive shaft 6. The drive key 12' is fit over the straddled broach 90 such that the sides 84, 85 of the slot are in contact with the sides 91, 92 of the straddled broach. The radiused top portion 72 of the slot 71 rests on the top radiused portion 93 of the straddled broach 90. As with the drive key 12, the drive key 12' mates with the recessed circular portion 96 and two of the four radial spokes 97–100 to transmit torque to the drive shaft. The radiused portions 80, 81 of the base portion of the tabs 73, 74 rest against the inner circumference of the opening 94, and the back surface 79 of the drive key 12 rests on the recessed circular portion 96 of the output gear 9. The leg portions 77,78 of the tabs extend into two of the radial spokes, e.g. 98 and 100.

Turning again to FIGS. 1 and 2, the drive shaft shank 11 passes through the opening 101 in the upper portion 4 of the gear box. A plastic thrust bearing 102 is positioned in the opening to provide a thrusting surface 103 for the drive key 12 through a washer 275 and a radial bearing surface for the shank 11. The drive key 12 is fixed to the shank 11 and the output gear 9, as described above. The shank 11 passes through the drive key 12 and the output gear, and is supported by a sleeve bearing 104 in the lower half 5 of the gear box 24.

Figure 15:
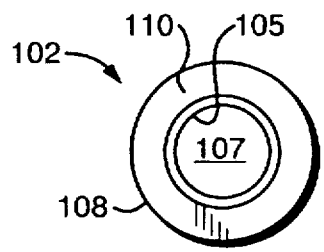
FIG. 15: is a top view of a plastic flange bushing according to the invention.
Figure 16:
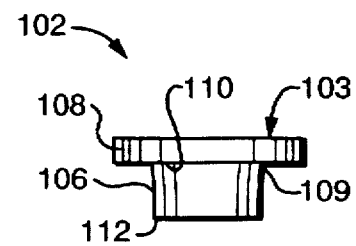
FIG. 16: is a side view of the plastic flange bushing shown in FIG. 15.

As shown in FIGS. 15 and 16, the plastic thrust bearing 12 is preferably nylon-based, and reinforced with carbon fiber. The bearing has a hollow cylindrical base portion 106 defining a bearing opening 107. A larger diameter cylindrical flange 108 extends from a top 109 of the base portion 106 concentric with the base portion. The base portion 106 of the bearing extends into the opening 101 with a bottom 110 of the flange resting against the bottom 111 of the upper half 4 of the gear box. The bottom surface 112 of the cylindrical portion 106 rests against a shelf 113, as shown particularly in FIG. 2, in the upper half 4 of the gear box. Thus positioned, the inner surface of the base portion provides a radial bearing surface 105 for the shank 11, and the top of the flange provides a thrust surface 103 for the drive key 12.

As discussed above, rotation of the shaft 6 causes the drive nut 23 to travel linearly along the length thereof. Advantageously the drive nut 23 of the present invention is a self-guided, high efficiency ACME nut. As shown in FIGS. 17–20, the drive nut 23 of present invention is formed using a reinforced, lubricated resin material for higher strength, higher efficiency, and greater thread accuracy. Preferably this material comprises nylon 6/6 with 13% PTFE, 2% silicone, and 10% carbon fiber.

The drive nut 23 is generally cylindrical in shape with a plurality of ribs 120. Two cylindrical recesses 225 and 226 are form in the side walls of the cylindrical nut 180° apart relative to the circumference thereof. The cylindrical recess provide means for securing the nut to a travel tube through a replaceable tube/nut connector guide, as will be described in more detail below.

The inner surface of the nut 23 has a right hand ACME thread 121 which mates with the ACME thread 122 on the drive shaft 6. The ACME thread 121 on the inner surface of the nut has a slightly tighter than standard major diameter on the thread form to maximize nut 23 to shaft 6 alignment. For example, the major diameter of the thread form on the drive nut 23 is 0.780" for a 0.75" thread on the drive shaft. In addition, a bearing section 123 is formed in the outboard end 124 of the nut 6 which runs tightly on the outside diameter of the thread 122 on the drive shaft 6. For example, in a preferred embodiment the diameter d of the bearing section 123 is approximately 0.755" for a 0.75" thread 122 on the drive shaft. The tight tolerance of the bearing section 123 to the threaded shaft eliminates the need for an end stabilizer on the shaft.

Turning again to FIG. 1, the amount of linear travel of the nut 23 along the shaft 6 is controlled by the upper and lower limit switches 13,14 through the timing gears 18–22 and the snap-fit adjustable cams 16,17. The cams 16, 17 rotate at a speed determined by the timing gears to disable power to the drive motor after a predetermined amount of time corresponding to the full travel of the nut 23 in a forward and reverse direction on the shaft. With reference to FIGS. 21–24, the lower cam 16 has a hollow cylindrical portion 130 with an end cap 131 and a cam portion 132 extending radially therefrom for tripping the lower limit switch 13. A hollow cylindrical bearing stud 133 extends axially from a bottom 134 of the end cap concentric with the cylindrical portion 133 and beyond the bottom edge 135 of the cylindrical portion. A cylindrical stud 136 extends axially from the bottom 134 of the end cap 131 within the diameter of, and concentric with, the cylindrical bearing stud 133.

Two leaf springs 137, 138 extend from the end cap 131 for securing the lower cam 16 to the upper cam 17. The leaf springs 137, 138 include flanged portions 139, 140, and are preferably spaced approximately 180° apart relative to the circumference of the lower cam. The circumferential edge 141 of the top of the end cap has a plurality of triangular teeth 142 formed therealong. In the preferred embodiment, approximately 120 equally spaced teeth are provided along the edge 141.

Figure 25:
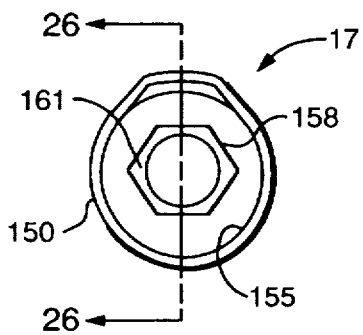
FIG. 25: is a top view of the upper snap-fit adjustable cam according to the invention.
Figure 26:
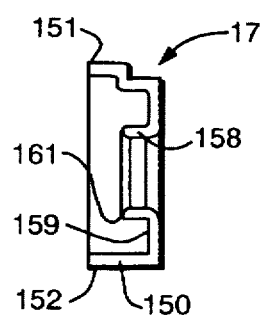
FIG. 26: is a sectional view of the upper snap-fit adjustable cam shown in FIG. 25.
Figure 27:
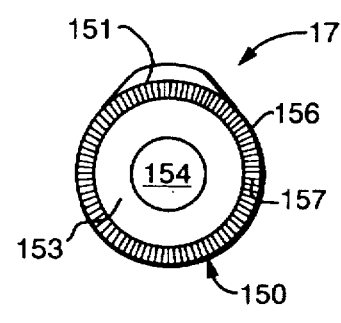
FIG. 27: is a bottom view of the upper snap-fit adjustable cam shown in FIG. 25.

As shown in FIGS. 25–27, the upper cam 17 has a cylindrically shaped base portion 150 with a cam portion 151 extending radially from a bottom 152 thereof for tripping the upper limit switch 14. An annular bottom 153 of the upper cam creates a reduced diameter opening 154 compared to the inside surface 155 of the bottom 152 of the cylindrical base portion 150. The circumferential edge 156 of the annular bottom 153 has a plurality of triangular teeth 157 formed therealong. In the preferred embodiment, approximately 120 teeth 157 are provided along the edge 156. An elongate hexagonal member 158 having an inner diameter equal to the diameter of the reduced diameter opening 154 extends axially from a top 159 of the annular bottom.

As shown in FIG. 1, the bearing stud 133 of the lower cam 16 bears on a bearing 160 extending through an opening in the bottom of the lower half 5 gear box 24. The cylindrical stud 136 extends through the bearing 160 and mates with an axial stud (not shown) on the gear 18. Rotation of the gear 18, thus causes rotation of the lower cam 16.

The upper cam 17 is snap-fit to the lower cam 16 by forcing the reduced diameter opening 154 of the upper cam over the leaf springs 137,138 on the lower cam. Under pressure, the leaf springs flex inwardly to and extend through the elongate hexagonal member 158. When the flanged portions 139, 140 of the leaf springs extend beyond the bottom edge 161 of the hexagonal member, they flex outwardly and engage the bottom edge 161. The lower cam can then be removed from the upper cam only by forcing the leaf springs inward and pushing them back through the elongate hexagonal member.

Advantageously, when the upper and lower cams are joined together, they are free to rotate relative to each other to allow the timing for tripping the upper and lower limit switches. At the interface between the upper and lower cams the teeth 142 on the lower cam engage the teeth 157 on the upper cam. The teeth 142, 157 travel over each other as the cams rotate and interlock at precise intervals. Accordingly, the teeth allow for precise adjustment of the relative positions of the upper and lower cams, and, therefore, the timing for tripping the limit switches.

Figure 28:
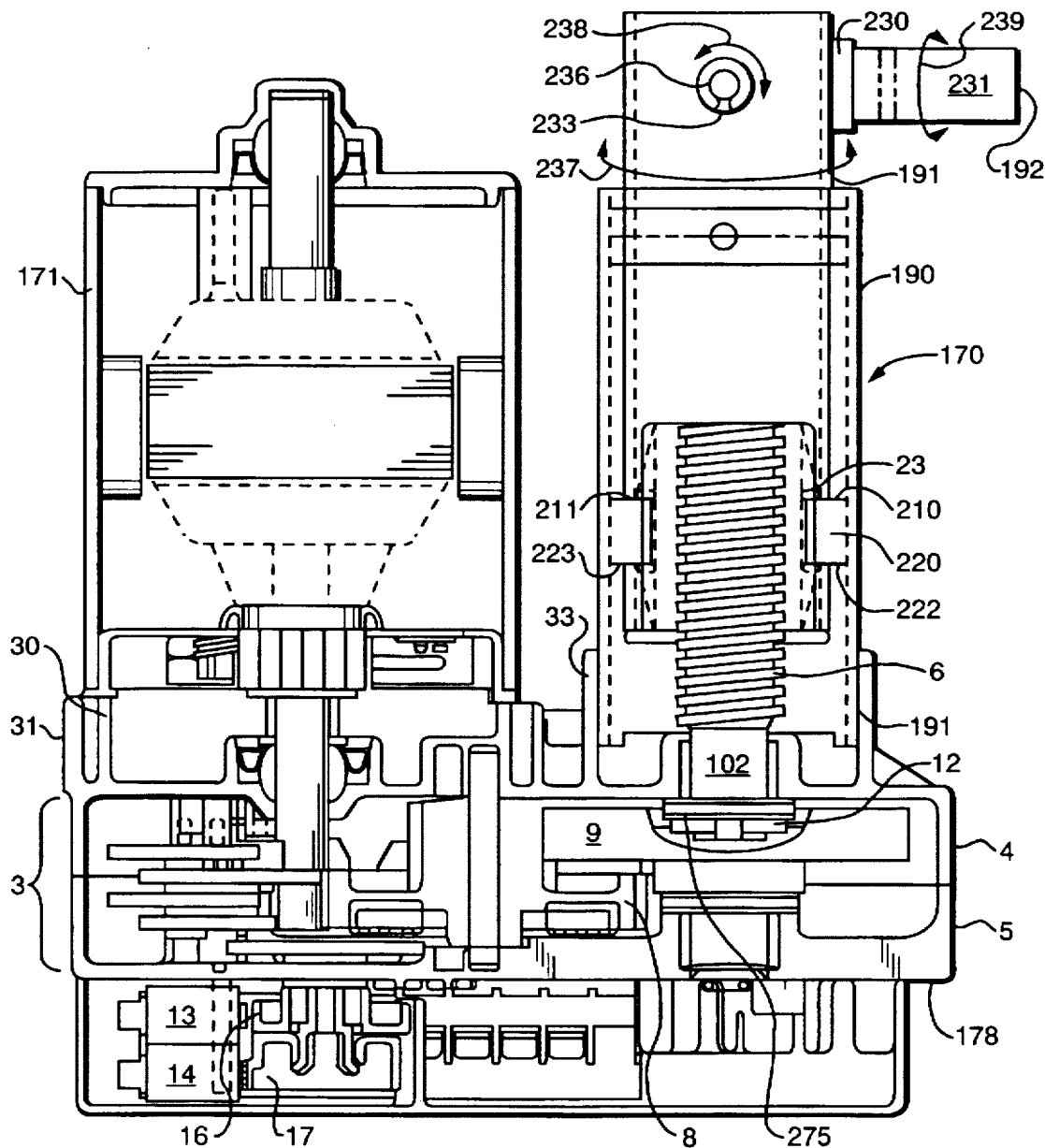
FIG. 28: is a side sectional view of a second embodiment of a linear actuator assembly according to the invention having a satellite actuator assembly mounted thereto.
Figure 29:
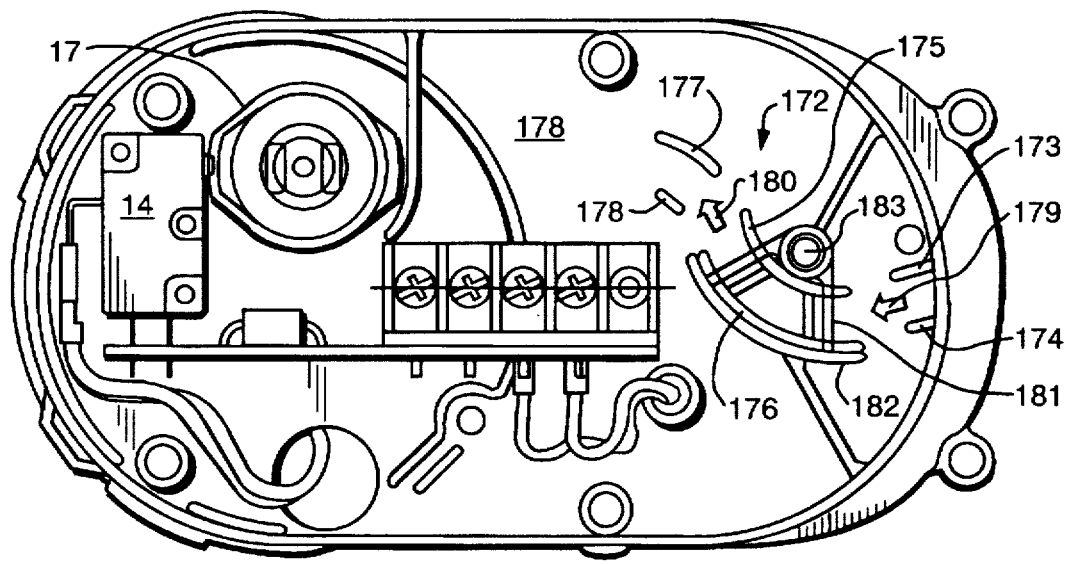
FIG. 29: is a sectional view of a bottom of the assembly shown in FIG. 28 showing an integral cord strain relief.

Turning now to FIG. 28, a preferred arrangement of a satellite dish actuator assembly 170 is shown. As shown, the satellite dish assembly is operated by a D.C. drive motor 171 fastened to the inner motor diameter wall 30 of the upper half 4 of the gear box 24. On the bottom 178 of the lower half 5 of the gear box 24 a strain relief 172 for the drive motor input electrical cord (not shown) is provided by die cast rims 173–177. The power cord is routed from outside of the housing in the direction of arrows 179, 180 between rims 173, 174 and then between rims 175, 176, and then between rims 177, 178. To secure the cord into position, a plastic part 181 is fit over the rims 175, 176 such that a rim 182 of the plastic part is disposed adjacent the outer edge of die cast rim 176. The plastic part is screwed to the housing through hole 183.

Figure 30:
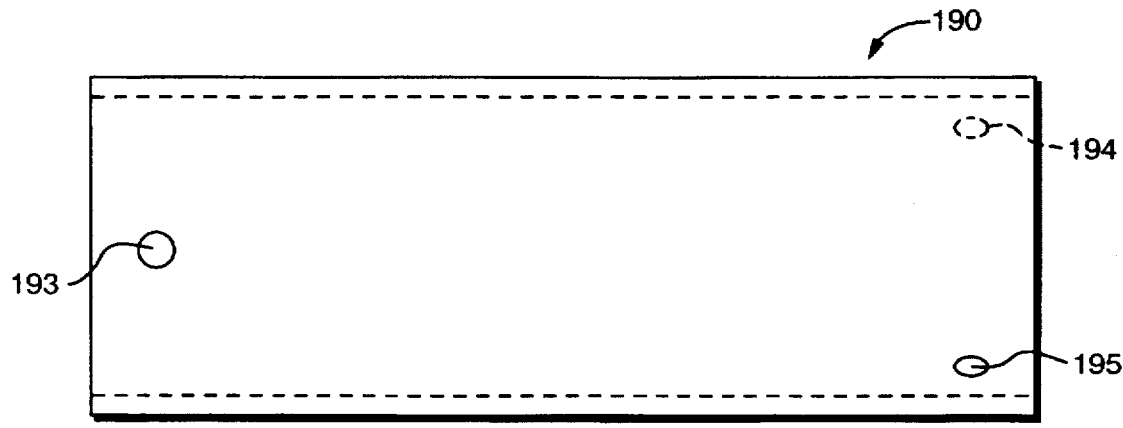
FIG. 30: is a side view of an outer tube or dust cover according to the invention.

The satellite dish actuator assembly generally includes: a hollow outer cylindrical tube or dust cover 190, a hollow inner cylindrical tube 191, and a three axis mounting stud 192. The outer tube 190, as shown particularly in FIG. 30, is preferably formed of cold rolled steel and has two through holes, e.g. 193–195, formed 180° apart on each end. To secure the outer tube to the gear box 24, the outer tube may be fastened to the dust cover wall 33 using screws (not shown) or the like, as shown in FIG. 26.

Figure 31:
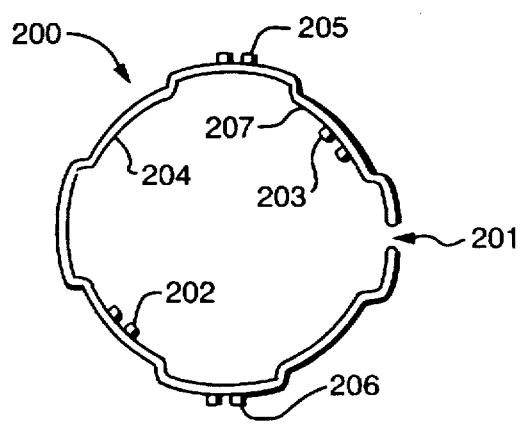
FIG. 31: is a front view of a dust cover adaptor according to the invention.
Figure 32:
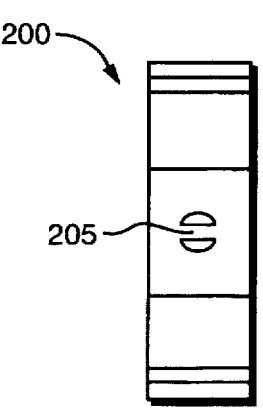
FIG. 32: is a side view of the dust cover adaptor shown in FIG. 32.
Figure 38:
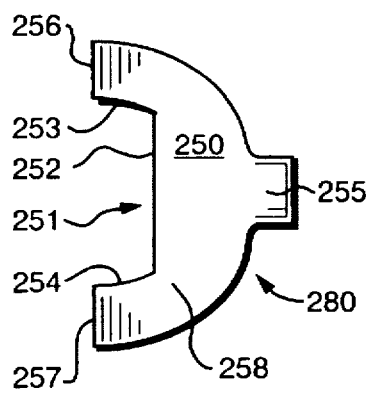
FIG. 38: is a rear view of a preferred drive key according to the invention.
Figure 40:
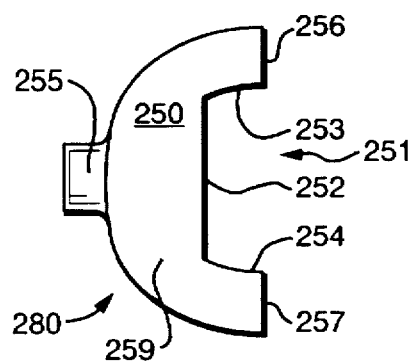
FIG. 40: is a front view of the drive key shown in FIG. 38.
Figure 39:
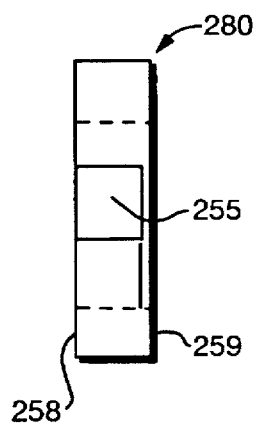
FIG. 39: is a side view of the drive key shown in FIG. 38.

Alternatively, a dust cover adaptor 200, as shown in FIGS. 31–32 may be used to mount the outer tube 190 to the upper half 4 of the gear box. The dust cover adaptor 200 is a generally cylindrical part with a split 201 therein for providing adjustability of diameter. Two outer tube tabs 202, 203 extend radially inward from the inner surface 204 of the adaptor, and two connecting tabs 205, 206 extend radially from the outer surface 207 of the adaptor. To mount the outer tube 190 to the adaptor, the outer tube tabs 202, 203 are mated with two of the through holes, e.g. 194, 195, in an end of the outer tube. The dust cover adaptor is then press fit into the cylindrical dust cover wall 33 to secure the outer tube 190 to the upper half 4 of the gear box. The dust cover adapter allows for one die casting to be used with multiple dust cover or outer tube diameters, and eliminates the need for fasteners for securing the outer tube to the gearbox.

Figure 17:
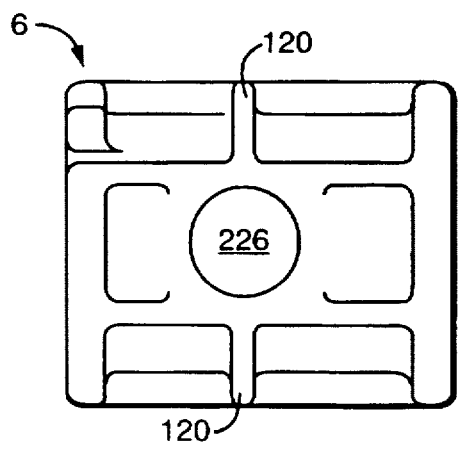
FIG. 17: is a side view of a drive nut according to the invention.
Figure 18:
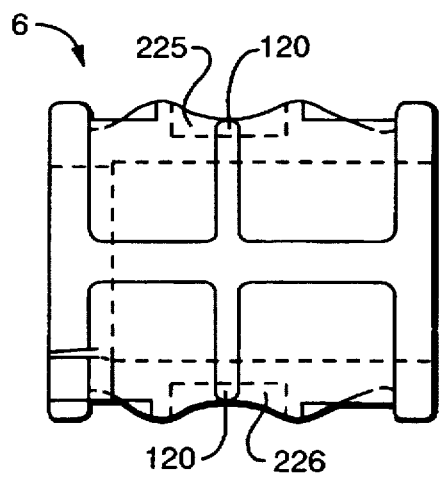
FIG. 18: is a top view of the drive nut shown in FIG. 17.
Figure 19:
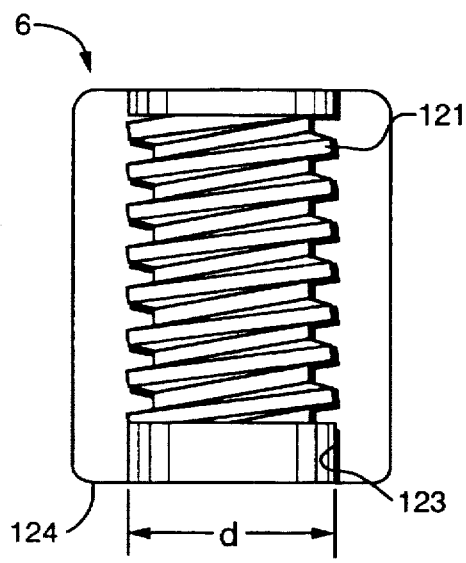
FIG. 19: is a partial sectional view of the drive nut of FIG. 17 showing internal threading.
Figure 20:
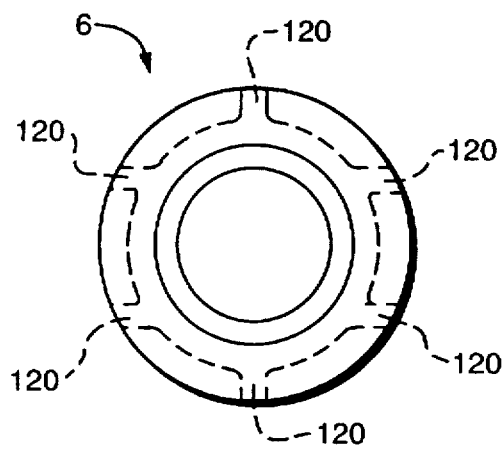
FIG. 20: is an end view of the drive nut of FIG. 17.
Figure 21:
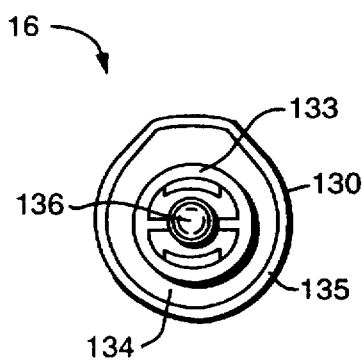
FIG. 21: is a bottom view of a lower snap-fit adjustable cam according to the invention.
Figure 22:
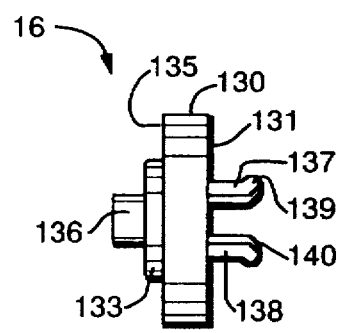
FIG. 22: is a side view of the lower snap-fit adjustable cam shown in FIG. 21.
Figure 23:
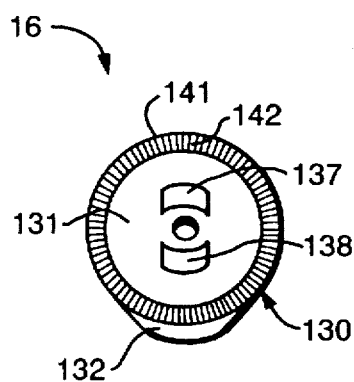
FIG. 23: is a top view of the lower snap-fit adjustable cam shown in FIG. 21.
Figure 24:
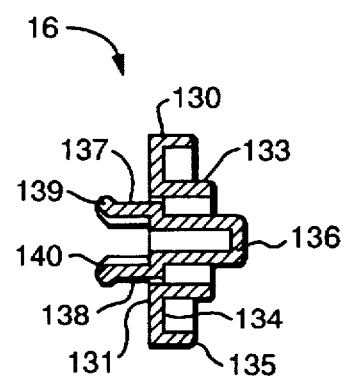
FIG. 24: is a sectional view of the lower snap-fit adjustable cam shown in FIG. 21.

Turning now to FIG. 33, the inner tube 191 is preferably formed of cold rolled steel, and has connector guide holes 210, 211 formed 180° apart on a first end 211 thereof. The inner tube 191 is secured to the drive nut 23 by a replaceable tube/nut connector guide 220, as shown FIGS. 34 and 35. The connector guide 220 is a semi-cylindrical plastic part having an opening 221. A pair of inner tube/nut tabs 222, 223 extend radially inward from the inner surface 224 of the connector guide. To secure the drive nut 23 to the inner tube 191, as shown in FIG. 28, the connector guide is positioned around the inner tube with the tube/nut tabs 222, 223 extending through the connector guide holes 210,211 and, simultaneously, through the corresponding cylindrical recesses 225, 226 in the drive nut 23, as shown in FIGS. 17 and 18. The replaceable tube/nut connector guide 220, thus, keys the drive nut to the inner tube while centering them both in the outer tube. Advantageously, all parts may be easily disassembled and when the outer tube 190 is removed.

The three axis mounting stud, as shown particularly in FIGS. 36 and 37, includes a base portion 230 with a stud portion 231 rotatably mounted therein. The base portion has a perpendicular bore 232 formed therein which corresponds to a pair of opposed through holes 233, 234 in the end 235 of the inner tube 191. The three axis mounting stud 192 is fixed to the inner tube by an expanding spring pin 236 (FIG. 28) which extends through the opposed through holes 233, 234 and the perpendicular bore 232.

In operation, the stud portion 231 is mounted to the satellite dish (not shown). As the inner tube 191 travels linearly along the drive shaft 6 to appropriately position the dish, the three axis mounting stud 192 allows the three axis of freedom to swivel as needed. As one axis of rotation, the three axis mounting stud may rotate about the center axis of the drive shaft 6 as shown by arrow 237. As a second axis of rotation, the three axis mounting stud 192 may rotate about the center axis of the expandable pin 236 as shown by arrow 238. As a third axis of rotation, the stud portion 231 may rotate about its center axis in the base portion 230 as indicated by arrow 239.

Thus, according to the present invention there is provided an improved linear actuator motor which includes many features for reducing the manufacturing steps and/or number of parts required in the production of such motors while maintaining high quality and reliability. The embodiments which have been described herein, however, are but some of the several which utilize this invention and are set forth here by way of illustration but not of limitation. It is obvious that many other embodiments, which will be readily apparent to those skilled in the art, may be made without departing materially from the spirit and scope of this invention.

What is claimed is:

1. An electro-mechanical linear actuator comprising:
   a gear box;
   a drive motor mounted to said gearbox;
   a gear train disposed within said gear box, said gear train having an input gear coupled to an output shaft of said drive motor; and
   a drive shaft coupled to an output gear of said gear train, wherein said gear box includes at least one indentation die-case in a side wall thereof, and wherein a casing of said drive motor is deformed into said indentation, thereby securing said drive motor to said gear box.

2. An electro-mechanical linear actuator according to claim 1, wherein said gear box includes at least one thin-walled portion in a side wall thereof, and wherein said casing of said drive motor is deformed through said at least one thin-walled portion, thereby securing said drive motor to said gear box.

3. An electro-mechanical linear actuator according to claim 2, wherein said gear box includes one of said indentations and two of said thin-walled portions.

4. An electro-mechanical linear actuator comprising:
   a gear box, said gear box including an upper die-cast portion and a separate lower die-cast portion, said lower die-cast portion having portions thereon for mounting at least one limit switch;
   a drive motor mounted to said gear box;
   a gear train disposed within said gear box, said gear train having an input gear coupled to an output shaft of said drive motor; and
   a drive shaft coupled to an output gear of said gear train by a drive key, said drive key having a first portion for transmitting torque and a second portion for transmitting thrust,
   wherein said drive key is keyed to said output gear to transmit torque from said output gear to said drive shaft through said first portion and to transmit thrust through said output gear through said second portion.

5. An electro-mechanical linear actuator according to claim 4, wherein said drive key has a slot therein which matingly engages a straddled broach formed in said drive shaft.

6. An electro-mechanical linear actuator according to claim 4, wherein said drive key is disposed within a mating recessed portion of said output gear, said drive key thereby being keyed to said output gear for rotation therewith.

7. An electro-mechanical linear actuator according to claim 6, wherein said drive key has first and second separate halves.

8. An electro-mechanical linear actuator according to claim 7, wherein said first and second separate halves have portions which, when joined together, define a slot in said drive key, and wherein said slot matingly engages a straddled broach formed in said drive shaft.

9. An electro-mechanical linear actuator according to claim 7, wherein each of said first and second separate halves of said drive key are generally semi-cylindrical in shape and wherein said first portion comprises at least one tab extending radially therefrom, said at least one tab matingly engaging a corresponding recess in said output gear.

10. An electro-mechanical linear actuator according to claim 4, wherein said drive key is generally cylindrical in shape and wherein said first portion comprises at least one tab extending radially therefrom, said at least one tab matingly engaging a corresponding recess in said output gear.

11. An electro-mechanical linear actuator comprising:

a gear box, said gear box including an upper die-cast portion and a separate lower die-cast portion, said lower die-cast portion having portions thereon for mounting at least one limit switch;

a drive motor mounted to said gear box;

a gear train disposed within said gear box, said gear train having an input gear coupled to an output shaft of said drive motor; and a drive shaft coupled to an output gear of said gear train, wherein said drive shaft extends from said output gear through a plastic thrust bearing disposed in an opening in said gearbox, said plastic thrust bearing thereby providing a radial bearing surface for said drive shaft.

12. An electro-mechanical linear actuator according to claim 11, wherein said plastic thrust bearing has a hollow cylindrical base portion and a larger diameter flange portion extending radially from a top of said base portion, and wherein said base portion extends into said opening in said gear box with said flange portion in contact with an inner wall of said gearbox.

13. An electro-mechanical linear actuator according to claim 12, wherein said plastic thrust bearing is nylon based and reinforced with carbon fiber.

14. An electro-mechanical linear actuator according to claim 12, wherein said drive shaft is coupled to an output gear of said gear train by a drive key, and wherein said plastic thrust bearing provides a thrusting surface for said drive key through a washer.

15. An electro-mechanical linear actuator comprising:

a gear box;

a drive motor mounted to said gear box;

a gear train disposed within said gear box, said gear train having an input gear coupled to an output shaft of said drive motor;

a threaded drive shaft coupled to an output gear of said gear train;

a drive nut positioned on said drive shaft, said drive nut having and interior surface with threads thereon which matingly engage corresponding threads on said drive shaft for causing said drive nut to travel linearly along said drive shaft upon rotation of said drive shaft;

an inner tube fixed to said drive nut, said inner tube having a pair of opposed openings in an end thereof; and a three axis mounting stud, said three axis mounting stud having a base portion with a stud portion rotatably disposed therein, said base portion having a bore therethrough in alignment with said pair of opposed openings in said inner tube, said mounting stud being rotatably secured to said inner tube by a pin extending through said bore and said opposed openings in said inner tube, wherein said mounting stud and said inner tube are rotatable about an axis of said drive shaft, said base portion is rotatable about said pin, and said mounting stud is rotatable in said base portion.

16. An electro-mechanical linear actuator comprising:

a gear box, said gear box having at least two motor diameter walls extending therefrom;

a drive motor mounted to said gearbox, said drive motor being supported by one of at least two motor diameter walls;

a gear train disposed within said gear box, said gear train having an input gear coupled to an output shaft of said drive motor; and a drive shaft coupled to an output gear of said gear train.

17. An electro-mechanical linear actuator according to claim 16, wherein said at least two motor diameter walls are concentric.

18. An electro-mechanical linear actuator according to claim 16, wherein said gear box is a die-cast gear box.

19. An electro-mechanical linear actuator comprising:

a gear box;

a drive motor mounted to said gear box;

a gear train disposed within said gear box, said gear train having an input gear coupled to an output shaft of said drive motor;

a threaded drive shaft coupled to an output gear of said gear train; and a drive nut positioned on said drive shaft, said drive nut having and interior surface with threads thereon which matingly engage corresponding threads on said drive shaft for causing said drive nut to travel linearly along said drive shaft upon rotation of said drive shaft;

wherein an inner tube fixed over said drive nut by a tube nut connector guide, said connector guide being a generally semi-cylindrical member having at least one tab extending radially inward from an inner surface thereof, said connector guide being positioned around said inner tube with said at least one tab extending through an opening in said inner tube and a corresponding opening in said drive nut to thereby secure said inner tube to said drive nut.

20. An electro-mechanical linear actuator according to claim 19, wherein said connector guide comprises two of said tabs.

21. An electro-mechanical linear actuator according to claim 19, said actuator further comprising an outer tube positioned over said tube nut connector guide, and wherein said connector guide is dimensioned to center said drive nut and said inner tube within said outer tube.

22. An electro-mechanical linear actuator comprising:

a gear box, said gear box having a dust cover wall extending therefrom defining a dust cover opening;

a drive motor mounted to said gear box;

a gear train disposed within said gear box, said gear train having an input gear coupled to an output shaft of said drive motor;

a threaded drive shaft coupled to an output gear of said gear train; and a drive nut positioned on said drive shaft, said drive nut having and interior surface with threads thereon which matingly engage corresponding threads on said drive shaft for causing said drive nut to travel linearly along said drive shaft upon rotation of said drive shaft;

an inner tube fixed to said drive nut, said drive nut being disposed within said inner tube; and an outer tube positioned over said inner tube;

wherein said outer tube is secured to said gear box by an adaptor, said adaptor being a generally cylindrical member having a slot therein and at least one tab extending radially inward from an inner surface thereof, said adaptor being positioned around said outer tube with said at least one tab extending through an opening in said outer tube, said adaptor being press fit against said dust cover wall into said dust cover opening, thereby securing said outer tube to said gearbox.

23. An electro-mechanical linear actuator according to claim 22, wherein said dust cover wall is generally cylindrical in shape with at least one slot therein, and wherein said adaptor has at least one tab extending from an exterior surface thereof, said at least one tab being positioned within said at least one slot in said dust cover wall.

24. An electro-mechanical linear actuator comprising:

a gear box;

a drive motor mounted to said gear box;

a gear train disposed within said gear box, said gear train having an input gear coupled to an output shaft of said drive motor;

a threaded drive shaft coupled to an output gear of said gear train; and a drive nut positioned on said drive shaft, said drive nut having a cylindrical bore therethrough defining an interior surface of said drive nut, said interior surface having threads thereon which matingly engage corresponding threads on said drive shaft for causing said drive nut to travel linearly along said drive shaft upon rotation of said drive shaft, wherein said interior surface has portions defining a bearing section at an end of said drive nut, said bearing section being dimensioned to run tightly against an outside diameter of said shaft as said drive nut travels along said shaft, and wherein said threads on said interior surface of said drive nut have a major diameter which is less than a standard ACME major diameter corresponding to said threads on said drive shaft, thereby maximizing alignment of said drive nut to said drive shaft.

* * * * *